United States Patent [19]

Otto

[11] 4,081,570

[45] Mar. 28, 1978

[54] PROCESS FOR PRODUCING A CONFECTION FROM SEED VESSELS

[75] Inventor: Friedrich Otto, Hameln (Weser), Germany

[73] Assignee: A. Stephan U. Sohne GmbH & Co., Hameln, Weser, Germany

[21] Appl. No.: 741,458

[22] Filed: Nov. 12, 1976

[30] Foreign Application Priority Data

Nov. 20, 1975 Germany .............................. 2552045

[51] Int. Cl.² ............................................... A23G 3/00
[52] U.S. Cl. .................................... 426/629; 426/660
[58] Field of Search ................................ 426/629–633, 426/660, 476, 507

[56] References Cited

U.S. PATENT DOCUMENTS

| | | | |
|---|---|---|---|
| 1,154,059 | 9/1915 | Rosello | 426/629 |
| 3,134,677 | 5/1964 | Glabe | 426/629 |
| 3,567,465 | 3/1971 | Knechtel | 426/629 |
| 3,821,431 | 6/1974 | Baudhuin | 426/629 |
| 3,978,246 | 8/1976 | Chozianin | 426/633 |

*Primary Examiner*—Jeanette M. Hunter
*Attorney, Agent, or Firm*—Michael J. Striker

[57] ABSTRACT

Producing a confection from seed vessels, by forming a mixture of sugar and cimminuted seed vessels, directly introducing steam into this mixture to heat it-to at most 120° C. and kneading to develop a throughly mixed mass. Subsequently the mixed mass is cooled to 50° C. and fashioned into a confection.

10 Claims, 1 Drawing Figure

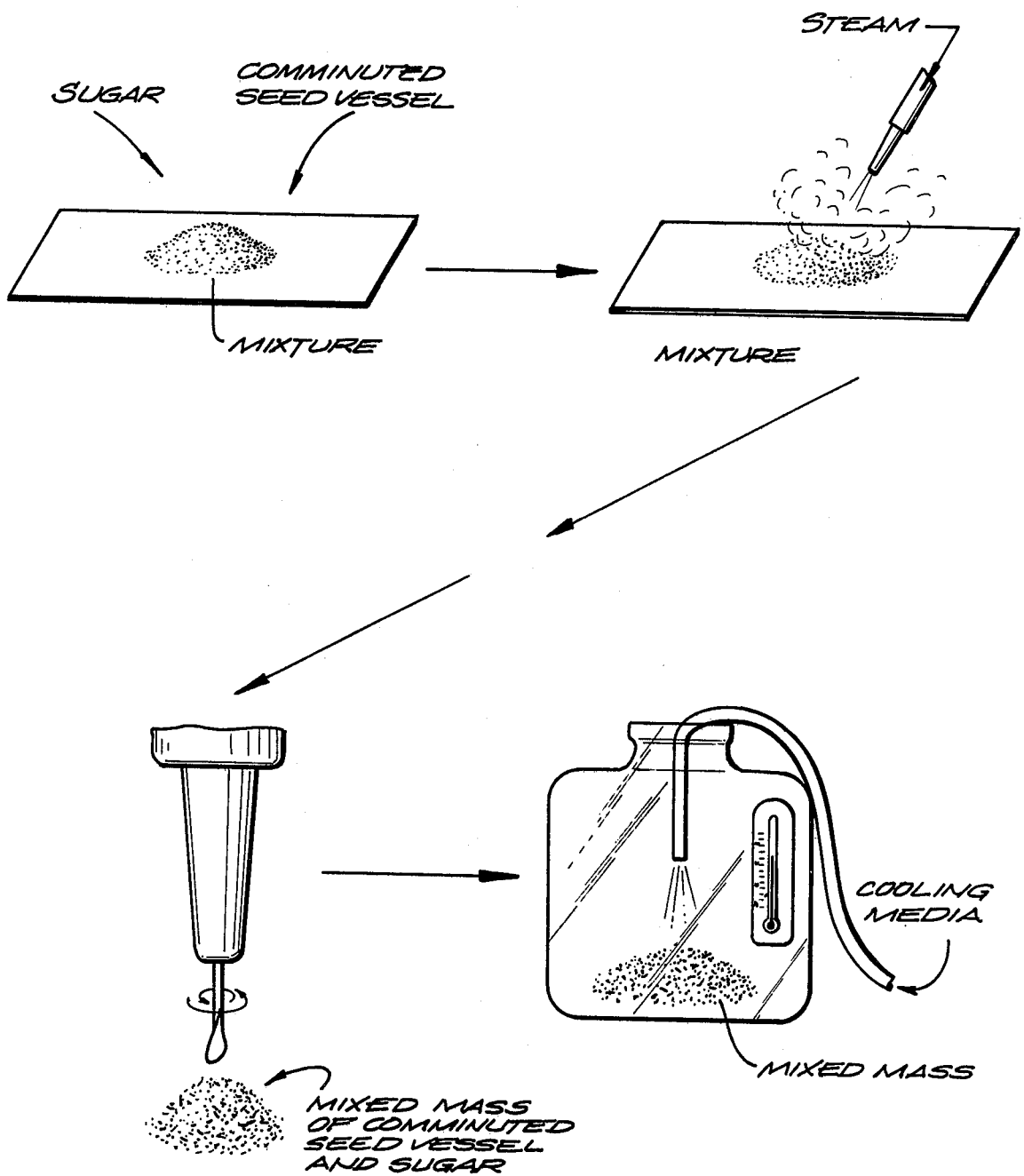

PROCESS FOR PRODUCING A CONFECTION FROM SEED VESSELS

BACKGROUND OF THE INVENTION

1. Field of the Invention

This invention is related to a process for producing confections, such as Marzipan or Persipan, from seed vessels. The term "seed vessels" as employed herein refers to nut meats and to fruit pits, such as apricot pits. Marzipan basically consists of almonds and sugar, while Persipan is basically made from apricot pits and sugar. A chocolate exterior is frequently provided. In order to prepare such confections, the nuts or pits are ground to small particles or, if preferred, into a fine powder. Sugar is added and the resultant mixture is kneaded and heated.

2. Description of the Prior Art

Conventional techniques for the production of confections from seed vessels involve washing, shelling and comminuting the seed vessels to particles of about 3-6 mm in diameter. Sugar is added, and the resultant mixture is conveyed over a roller frame to an open roasting chamber. In the roasting chamber, the mixture is heated to a high temperature, generally up to 95° C. The purpose of this heating is to sterilize the mixture, and to evaporate a certain amount of the water content of the mixture.

At the present time, it is conventional to indirectly heat the mass of seed vessels and sugar in an open roasting chamber, in which the mass is in contact with the ambient atmosphere. A sterilizing temperature is maintained for about 30 minutes, during which time manual operations are required. The contact of the mass with the ambient atmosphere and the requisite manual operations present the menace of contamination of the mass. The heated mass is then cooled to about 50° C, for another period of about 30 minutes, usually through the medium of cold water or brine. Then the mass is dried. At the end of this process, the mass of seed vessels and sugar is ready for packing.

The conventional techniques are primarily disadvantageous because of the large amount of time which must be invested in carrying out the process. This time cannot be reduced in the known process, because of the need to sterilize the mass. A basic disadvantage of the conventional techniques is that the contact of the mass with the ambient atmosphere is a practice which is incompatible with modern standards of hygiene. The requisite manual operations furnish still another source of possible contamination. A further disadvantage follows from the excessive amount of energy which is lost to the ambient atmosphere during the slow duration of the conventional techniques. Also, the means for conveying the mass requires intensive control; for such a minor part of the production process, this magnitude of control is very expensive. A still further disadvantage results from the requisite preliminary crushing of the seed vessels before beginning the conventional techniques. Still another disadvantage is that the comminuting equipment of the conventional techniques are subject to a great deal of wear and tear, at least 80% of which is attributable to the grinding of sugar.

SUMMARY OF THE INVENTION

It is the primary object of the present invention to provide a process for the production of a confection from seed vessels which avoids the aforementioned problems and shortens the requisite time for producing a confection from seed vessels.

It is another object of the present invention to provide a process for the production of a confection from seed vessels in which it is not absolutely necessary to preliminarily crush the seed vessels before adding sugar.

It is still another object of the present invention to provide a process for the production of a confection from seed vessels in which seed vessels and sugar may be circulated through a comminuting apparatus for a duration during which seed vessels and sugar may be mixed, then comminuted, kneaded and heated to a temperature of up to 80° C, with such heating anticipating a part of the heating in the roasting oven.

It is a further object of the present invention to provide a process for the production of confections from seed vessels in which improved hygienic practices are used in order to minimize possibilities of contamination.

It is still a further object of the present invention to provide a method for conveying a mixture of seed vessels and sugar in a highly revolving circular apparatus.

The preparation of the seed vessels follows that of conventional techniques except that the seed vessels do not have to be preliminarily comminuted. The present invention is directed to a process for producing a confection from seed vessels, such as nuts or fruit pits, by first forming a mixture of sugar and comminuted seed vessels. Heated gases are directly introduced to this mixture in order to heat the mixture up to a maximum of 120° C. Direct introduction of the gases minimizes the time required for sterilization and minimizes the possibility of contamination. The mixture is kneaded in order to form a well-developed mass. Subsequently, this mass is cooled to a temperature suitable for packaging the mass — i.e., to about 45° to 50° C. The entire process can be carried out in an automated closed system in order to minimize the possibility of contamination of the seed vessel — sugar mixture. Because the sugar is cooked by the heated gases, problems of corrosion of the comminuting equipment are obviated.

BRIEF DESCRIPTION OF THE DRAWING

The single FIGURE shows the steps of the present invention.

DETAILED DESCRIPTION OF A PREFERRED EMBODIMENT

The above objects of the invention, and others which will become apparent, are accomplished according to the present invention by initially forming a mixture of sugar and comminuted seed vessels, such as nut meats and fruit pits. The order of addition of the sugar and the seed vessels is not important in the process of the present invention. According to the present invention, the comminution can be completed in one step; there is no need for a prior comminution in order to attain a manageable size of seed vessel particles. In the invented process, the fineness of the mixture is exclusively determined by the fineness of the seed vessel portion; no longer does the sugar portion determine the fineness of the mixture.

Heated gases are directly introduced to the mixture of seed vessels and sugar. Preferably, the heated gas will be steam. The mixture is heated to at most 120° C. The mixture is cooked by this heating. The cooking accomplishes two objects: first, the mixture is sterilized, and second, the sugar is liquefied by the steam. Because of liquefication of the sugar, grinding it is unnecessary.

Because the heat is directly supplied to the mixture of seed vessels and sugar, the entire time for the presently invented process need only be about 5 to 15 minutes. Other components of the recipe, such as spices and food coloring, for the confection may be added during, or, in certain cases, before the heating.

According to the presently invented process, the entire process for producing a confection from seed vessels can be done in a closed system. It is particularly advantageous to perform all of the steps of comminution, cooking, kneading, drying and cooling in a single machine. By performing the steps of present process in a single machine, a germ-free atmosphere can be maintained around the mixture of seed vessels and sugar.

It is advantageous to knead the mixture during or following the heating, in order to thoroughly mix the seed vessels and the sugar.

Confection recipes of some countries generally require some degree of dehydration of the seed vessel — sugar mixture. Moisture tends to condense in the mixture because of the use of steam. It is advantageous to evaporate moisture before or during the step of cooling. If the mixture is placed under vacuum, removal of moisture is accelerated by indirectly heating the mixture up to a maximum of 120° C, through the medium of, for example, a double-walled jacket.

Following heating, the mixture is cooled to a temperature suitable for packaging. The cooling can be done directly or indirectly. If done indirectly, cold water or customary cooling media, such as Frigen, may be used. If done directly, nonreactive gases, such as carbon dioxide cooled to a temperature below 0° C, may be used. Preferably, the cooling is done under vacuum.

To further shorten the time required for the presently invented process, it is advantageous to furnish nozzles in the heating chamber. Through the nozzles, the heated gases are sprayed upon the individual particles.

According to the present invention, all of the steps of the invented process can be done in a closed system — in one machine. As a result, the entire process of the present invention can be completed in 5 to 15 minutes. The speed of the process can be varied by varying the form of the circulating apparatus. The presently invented process conserves energy because of its efficiency, shortens the processing time by its method of heating and its dispensation with preliminary steps. The presently invented process produces a product which is hygienically better, and lowers costs by minimizing the corrosion which the comminuting equipment must undergo. It is estimated that the minimizing of this corrosion will make investment costs at least 50% lower. The presently invented process can be performed in a smaller space than the conventional techniques because of the compact nature of the presently invented process. The entire presently invented process can be completely automated in order to dispense with the need for manual operation.

Furthermore, the presently invented process can be varied so as to add the seed vessels during or after the cooking of sugar. Then the seed vessels, customarily kept cold — between 20° and 30° C, are added to a sugar solution which is at a temperature no greater than 120° C.

The present invention may be embodied in other specific forms without departing from the spirit or essential characteristics thereof. The presently disclosed embodiments are therefore to be considered in all respects as illustrative and are not restrictive, the scope of the invention being indicated by the appended claims, rather than by the foregoing description, and all changes which come within the meaning and range of equivalency of the claims are, therefore, to be embraced therein.

I claim:

1. A process for producing a confection from seed vessels, comprising the steps of:
   (a) forming a mixture of sugar and comminuted seed vessels:
   (b) introducing heated gases directly to said mixture so as to heat said mixture to at most 120° C;
   (c) kneading said mixture so that a mixed mass is formed; and
   (d) cooling the mixed mass to at most 50° C.

2. A process as recited in claim 1, wherein the comminuted seed vessels are added while the sugar is being heated.

3. A process as recited in claim 1, wherein the comminuted seed vessels are added after the sugar has been heated.

4. A process as recited in claim 1, further comprising maintaining a vacuum around said mixture.

5. A process as recited in claim 1, wherein excess moisture is removed by indirectly heating said mixture while it is under vacuum.

6. A process as recited in claim 1, wherein said cooling is done directly through the medium of carbon dioxide cooled to a temperature below 0° C.

7. A process as recited in claim 1, wherein said introducing step comprises introducing steam to said mixture and incidentally condensing some of said steam to form moisture within said mixture.

8. A process as recited in claim 7, further comprising removing said condensed moisture before cooling from said mass by maintaining the mixture under vacuum while accelerating removal of moisture by heating said mixture up to a maximum of 120° C.

9. A process as recited in claim 8, wherein said accelerating by heating step takes place through the medium of a double-walled jacket.

10. A process as recited in claim 7, further comprising removing said steam from said mass during cooling by maintaining the mixture under vacuum.

* * * * *